Sept. 2, 1952 J. R. PIERCE 2,609,520

CATHODE-RAY TUBE

Filed June 11, 1947

INVENTOR
J. R. PIERCE
BY Hugh S. Wertz
ATTORNEY

Patented Sept. 2, 1952

2,609,520

UNITED STATES PATENT OFFICE 2,609,520

CATHODE-RAY TUBE

John R. Pierce, Millburn, N. J., assignor to Bell Telephone Laboratories, Incorporated, New York, N. Y., a corporation of New York Application June 11, 1947, Serial No. 753,982

7 Claims. (Cl. 315—6)

This invention relates to cathode ray devices and more specifically to cathode ray devices which are adapted to be used in systems employing ultra-high frequency carrier waves.

It has become customary in television to utilize a cathode ray tube as the picture-reproducing member in the receiving system. In the usual television arrangement at the receiver station, the signal-modulated carrier wave is detected and amplified and the resultant picture or video signal applied to the modulating element of the cathode ray tube which is separate from the detector and amplifier. The present invention relates to arrangements in which ultra-high frequency waves, such as those of 10 centimeter or 3 centimeter wavelengths, for example, are used as carriers in television systems. The invention has other applications also, as for example in radar systems and cathode ray oscilloscope arrangements.

It is an object of this invention to simplify the equipment required at a station employing a cathode ray tube as a picture-reproducing or indication-forming device, particularly where ultra-high frequency waves are used to carry the signals used to reproduce the picture or produce the indication.

It is another object of this invention to combine, in a single envelope, cathode ray beam producing and deflecting means and an ultra-high frequency detecting element.

It is a further object of this invention to combine in a single envelope the elements of a cathode ray tube and also means for detecting and amplifying ultra-high frequency signal-modulated carrier waves.

In accordance with the invention, a cathode ray television receiver tube is provided in which ultra-high frequency, signal-modulated carrier waves are applied directly to a resonant cavity member within the tube to vary the focus of the beam passing through this member with respect to an aperture in an adjacent diaphragm member to thereby modulate the beam. The high frequency waves applied to the resonant cavity member set up a voltage variation across the gap therein which causes the focus of the beam to change. Conditions may be chosen so that with no signals applied to the tube the beam is either (1) in sharp focus at the aperture, permitting a maximum number of electrons to pass through the aperture when no signal is applied, or (2) in a defocussed condition at the aperture, permitting a minimum number of electrons to pass through the aperture when no signal is applied. When signals are applied, the beam current through the aperture is decreased for the first set of conditions and increased if the tube is operating under the second set of conditions. One or more other resonant cavity members can be included in the tube for purposes of amplification.

Figure 1:
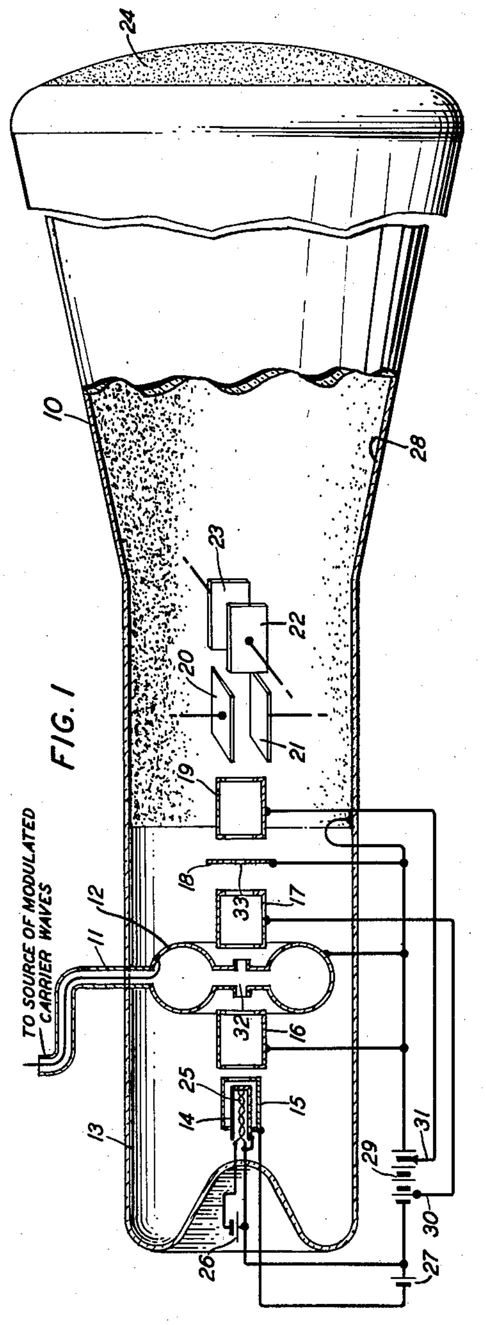
Figure 2:
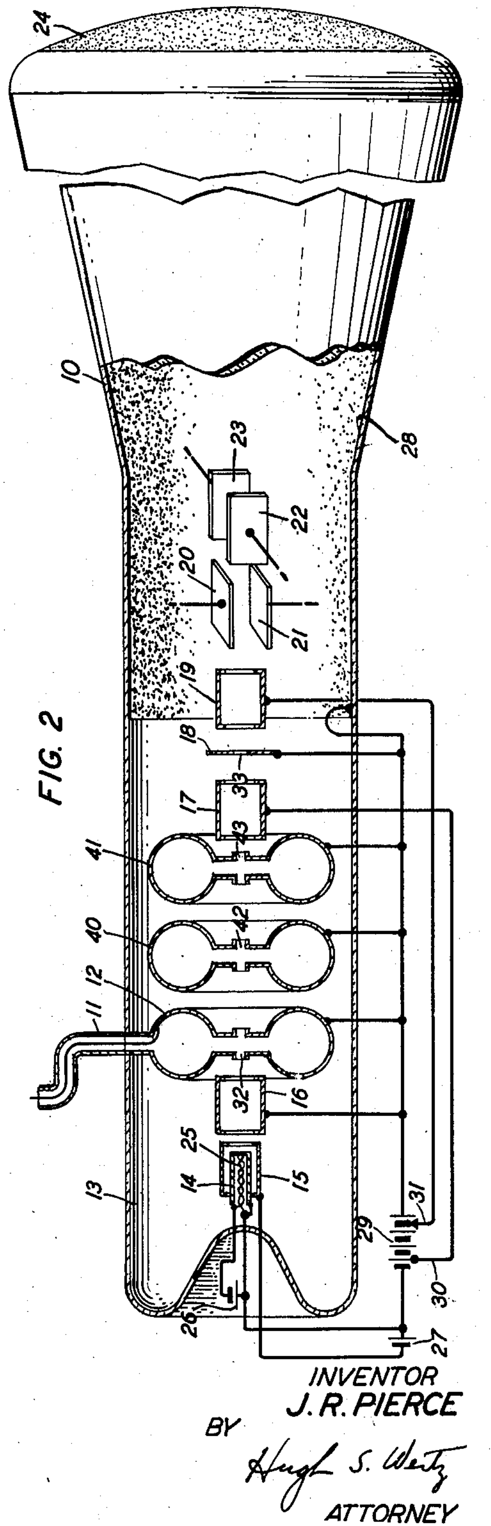

The invention will be more readily understood by referring to the following description taken in connection with the accompanying drawings forming a part thereof in which:

Fig. 1 is a schematic representation of a television receiver tube embodying a resonant cavity member to which ultra-high frequency, signal-modulated carrier waves are applied directly; and Fig. 2 is a schematic representation of a tube such as is shown in Fig. 1 with two additional resonant cavity members included in the tube for purposes of amplification.

Referring more specifically to the drawing, Fig. 1 shows, by way of example for purposes of illustration, a cathode ray television receiver tube 10 which acts both as a reproducer of signals and as a detector of incoming ultra-high frequency signal-modulated carrier waves. These signal waves may comprise received television signals which have been given a preliminary stage or two of amplification prior to detection. In the ordinary television system they would then be applied to a detector to produce an output signal which is usually called a "video" signal since it contains elements which are utilized to produce the picture on a screen of the receiving tube. In the present arrangement, these modulated carrier waves are applied directly through a coaxial cable or wave guide 11 to a resonant cavity member 12 within the tube 10. This tube comprises an evacuated container 13 enclosing a cathode member 14, a focussing control member 15, anode members 16, 17, 18 and 19, the resonant cavity member 12 between the anodes 16 and 17, and two pairs of electrostatic deflecting elements 20, 21 and 22, 23, respectively. A coating 28 serves as a final anode member. On the end of the cathode ray tube remote from these electrode elements is a suitable fluorescent screen 24.

The cathode 14 is heated by a suitable heater 25 receiving current from a source 26. The control element 15 is placed at a negative potential with respect to the cathode 14 by means of a source 27 and acts in the manner of the well-known Wehnelt cylinder to aid in the focussing of the stream of electrons admitted from the cathode 14 into a beam. The cylindrical anode 16, the apertured disc member 18, the resonant cavity member 12 and the conducting coating 28 are all placed at the same potential, which is highly positive with respect to the cathode potential, by means of a source 29. The cylindrical electrode members 17 and 19 are placed at potentials which are higher than that of the cathode and which are positive with respect to the cathode but not as highly positive as that of the members 16, 12, 18 and 28, respectively, by means of intermediate taps 30 and 31 on the source 29. The various electrode elements have potentials applied to them which are appropriate for beam focussing.

The electrons emitted by the cathode 14 and formed into a narrow beam by the action of the cylinder 15 and the anode cylinder 16 pass through the gap 32 in the toroidal resonant cavity member 12 to which are applied the ultra-high frequency, signal-modulated carrier waves. The beam is then directed toward the aperture 33 in the electrode 18 by means of the anode members 17 and 18, and the beam has a final acceleration and focussing action imparted to it by the anode member 19 and the conducting coating 28. The electrons passing through the aperture 33 in the member 18 are deflected in two coordinate directions at right angles to one another by means of suitable deflecting fields of frame scanning frequency and line scanning frequency, respectively, applied to the deflecting plates 20, 21 and 22, 23.

The beam emerging from gap 32 comprises electrons which, in the absence of incoming signals over coaxial line 11, have a normal velocity dependent upon the accelerations which they have experienced. As is well known, such a beam may be focussed at a point in its path by a focussing device such as a ring or tube having a proper configuration and position with reference to the beam and having its electrical potential properly chosen with respect to that of the preceding electrode and the velocity of the electrons. If, now, in some manner, the electron velocity be materially changed the beam will focus at a different point in its course. This phenomenon is utilized in the present invention by placing a diaphragm with a small aperture in the path of the beam and designing the apparatus so that for one electron velocity the beam will focus at the aperture and substantially all its electrons will pass through it while at a materially different velocity the beam will be defocussed at the aperture and only a small portion of its electrons will be able to pass through the aperture. This change in velocity of the electrons will, therefore, result in a change in the current passing through the aperture 33 and hence in the brilliancy of the spot which the beam finally makes on the screen 24.

It will be apparent that either of two possible designs can be made. In the first of these the shapes and spacings of the elements 14, 15, 16, 12, 17 and 18 and the potentials applied thereto are so chosen that when no oscillations are applied by the input line 11 to the resonator the stream of electrons at normal velocity is in a defocussed condition at the aperture 33, permitting a minimum number of electrons to pass through the aperture. Upon application of signal oscillations to the resonator 12, the electrons passing through gap 32 experience a variation in velocity so that they now focus at the aperture 33, thus increasing the number of electrons passing therethrough.

In the second of these designs, the shapes and spacings of the elements 14, 15, 16, 12, 17 and 18 and the potentials applied thereto are so chosen that in the absence of an input signal over coaxial line 11 the stream of electrons at its normal velocity is in a focussed condition at the aperture 33. Accordingly, the presence of signal oscillations in the line 11 will result in disturbing this focussed condition by causing the beam to be defocussed at the aperture 33, thus decreasing the number of electrons passing through the aperture.

The system of Fig. 1 makes it unnecessary to demodulate an ultra-high frequency, signal-modulated carrier wave with an external microwave detecting system and then apply the demodulated waves to a conventional television receiver tube. A great simplification of apparatus therefore results by using the present invention.

In the system of Fig. 2, two additional resonant cavity members 40 and 41 are added to the structure shown in Fig. 1 for purposes of amplification. All the resonant cavity members are connected to the positive terminal of the source 29. The operation of the arrangement including the resonant cavity members 12, 40 and 41 is as follows: The beam of electrons is formed and focussed as in the apparatus of Fig. 1. The input to the member 12 causes a voltage across the gap 32, varying the velocity of electrons passing through this gap. In passing from gap 32 to gap 42 in the resonant cavity member 40 this velocity variation is converted into a density variation. This density variation produces oscillations in the resonant cavity 40 and these in turn produce a varying voltage across the gap 42 thus causing a velocity variation in the beam which is more pronounced than at the gap 32. The velocity variation in the beam leaving the gap 42 produces a density variation in the beam passing from this gap to the gap 43 in the resonant cavity member 41. The density varied beam produces oscillations in the resonant cavity 41 which in turn set up a varying electromotive force across the gap 43 and produce a velocity variation in the beam still larger than that of the gap 42 and much larger than that of the gap 32. The beam after it leaves the gap 43 is acted upon and operates in the same manner as the beam of Fig. 1 after it leaves the gap 32. However, because of the increased velocity variation effected by the cascade amplifying action of the structure of Fig. 2, there is a greater shifting of the focus in the region of the aperture 33 than it is possible to secure with the structure of Fig. 1.

Obviously, various modifications may be made in the arrangements described above without departing from the spirit of the invention, the scope of which is indicated in the claims.

What is claimed is:

1. A cathode ray device comprising an evacuated envelope enclosing the following elements: means for generating a beam of electrons of non-parallel rays, an apertured member the aperture of which lies in the path of said beam, a cavity resonator between said apertured member and said beam generating means, a cylindrical focussing member between said cavity resonator and said apertured member, means coupled to said resonator for applying varying signals thereto to vary correspondingly that component of velocity of beam electrons which is parallel to the beam axis to change the condition of focus of the rays of the beam and thereby vary the beam density at said aperture, and a fluorescent target on the side of said apertured member remote from said cavity resonator for intercepting the electrons which pass through said aperture.

2. A cathode ray device comprising an evacuated envelope enclosing the following elements: means for generating a beam of electrons of non-parallel rays, an apertured member the aperture of which lies in the path of said beam, located between said generating means and said apertured member for bringing said beam to a sharp focus at the aperture, a cavity resonator between said apertured member and said beam generating means, means coupled to said resonator for applying varying signals thereto to vary correspondingly that component of velocity of beam electrons which is parallel to the beam axis to change the condition of focus of the rays of the beam and thereby vary the beam density at said aperture, and a fluorescent target on the side of said apertured member remote from said cavity resonator for intercepting the electrons which pass through said aperture.

3. A cathode ray device comprising an evacuated envelope enclosing the following elements: means for generating a beam of electrons of non-parallel rays, an apertured member the aperture of which lies in the path of said beam, means located between said generating means and said apertured member for causing said beam of electrons to be in a defocused condition at said aperture, a cavity resonator between said apertured member and said beam generating means, means coupled to said resonator for applying varying signals thereto to vary correspondingly that component of velocity of beam electrons which is parallel to the beam axis to change the condition of focus of the rays of the beam to vary thereby the beam density at said aperture in accordance with said amplitude, and a fluorescent target on the side of said apertured member remote from said cavity resonator for intercepting the electrons which pass through said aperture.

4. A cathode ray device comprising an evacuated envelope enclosing the following elements: means for generating a beam of electrons of non-parallel rays, an apertured member the aperture of which lies in the path of said beam, a cavity resonator between said apertured member and said beam generating means, means coupled to said resonator for applying varying signals thereto to vary correspondingly that component of velocity of beam electrons which is parallel to the beam axis to change the condition of focus of the rays of the beams and thereby vary the beam density at said aperture in accordance with said amplitude, a fluorescent target on the side of said apertured member remote from said cavity resonator for intercepting electrons which pass through said aperture, means located between said cavity resonator and said target for focusing electrons in said beam to a fine spot at said target, and means for moving said beam over a two-directional scanning pattern on said target.

5. A cathode ray device comprising an evacuated envelope enclosing the following elements: a cathode for generating a stream of charged particles, a resonating chamber along the path of the stream of charged particles, means coupled to said chamber for applying thereto an ultra-high frequency signal modulated wave, a fluorescent target in the path of said stream, an apertured member placed between the resonating chamber and said target, the aperture of said member surrounding the axis and being smaller than the cross section of said stream when the latter is in a defocused condition at said aperture, and means located between said resonating chamber and said target for focusing the electrons which pass through said aperture to form a spot on said target.

6. A cathode ray device comprising an evacuated envelope enclosing the following elements: means for generating a beam of electrons of non-parallel rays, an apertured member the aperture of which lies in the path of said beam, a cavity resonator between said apertured member and said beam generating means, means coupled to said resonator for applying varying signals thereto to vary correspondingly that component of velocity of beam electrons which is parallel to the beam axis to change the condition of focus of the rays of the beam and thereby vary the beam density at said aperture, an additional cavity resonator between said first cavity resonator and said apertured member to amplify the action of the first cavity resonator, and a fluorescent target on the side of said apertured member remote from said cavity resonators for intercepting the electrons which pass through said aperture.

7. A cathode ray device comprising an envelope enclosing the following elements: means for generating a beam of electrons of non-parallel rays, an apertured member the aperture of which lies in the path of said beam, a cavity resonator between said apertured member and said beam generating means, means coupled to said resonator for applying varying signals thereto to vary correspondingly that component of velocity of beam electrons which is parallel to the beam axis to change the condition of focus of the rays of the beam and thereby vary the beam density at said aperture, a second cavity resonator between said first cavity resonator and said apertured member to amplify the action of the first cavity resonator, a third cavity resonator in the path of said stream for further amplification purposes, and a fluorescent target on the side of said apertured member remote from said cavity resonators for intercepting the electrons which pass through said aperture.

JOHN R. PIERCE.

REFERENCES CITED

The following references are of record in the file of this patent:

UNITED STATES PATENTS

| Number | Name | Date |
|---|---|---|
| 2,081,942 | Lubcke | June 1, 1937 |
| 2,171,970 | Brett et al. | Sept. 5, 1939 |
| 2,272,165 | Varian | Feb. 3, 1942 |
| 2,288,694 | Fry | July 7, 1942 |
| 2,407,708 | Kilgore | Sept. 17, 1946 |
| 2,409,179 | Anderson | Oct. 15, 1946 |
| 2,413,244 | North | Dec. 24, 1946 |
| 2,413,725 | McNally | Jan. 7, 1947 |
| 2,462,496 | Herold | Feb. 22, 1949 |

OTHER REFERENCES

Journal of Applied Physics, vol. 10, No. 5, May 1939, pp. 321–327.